United States Patent
Takeda

(10) Patent No.: US 8,472,033 B2
(45) Date of Patent: Jun. 25, 2013

(54) METHOD OF DETECTING AMOUNT OF AXIS DISPLACEMENT IN POWER TRANSMISSION DEVICE USING AUTOMATIC SELF-ALIGNING ENGAGEMENT CLUTCH

(75) Inventor: Kenyu Takeda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 416 days.

(21) Appl. No.: 12/808,292

(22) PCT Filed: Mar. 17, 2009

(86) PCT No.: PCT/JP2009/055728
§ 371 (c)(1),
(2), (4) Date: Jun. 15, 2010

(87) PCT Pub. No.: WO2009/122947
PCT Pub. Date: Oct. 8, 2009

(65) Prior Publication Data
US 2011/0149300 A1    Jun. 23, 2011

(30) Foreign Application Priority Data
Mar. 31, 2008   (JP) .................................. 2008-090139

(51) Int. Cl.
G01B 11/14    (2006.01)
G01B 5/24     (2006.01)
G01B 13/18    (2006.01)
G01N 25/16    (2006.01)

(52) U.S. Cl.
USPC ................................ 356/614; 374/55; 33/412

(58) Field of Classification Search
USPC ................................ 356/614; 374/55; 33/412
See application file for complete search history.

(56) References Cited

U.S. PATENT DOCUMENTS

| 3,783,522 | A  |   | 1/1974  | Dodd |
| 5,359,884 | A  |   | 11/1994 | Fey et al. |
| 5,519,204 | A  | * | 5/1996  | Rudd et al. ..................... 250/205 |
| 6,810,669 | B2 | * | 11/2004 | Tanaka et al. ................... 60/711 |

(Continued)

FOREIGN PATENT DOCUMENTS

| CN | 1603578  | 4/2005 |
| JP | 53-30124 | 8/1978 |

(Continued)

OTHER PUBLICATIONS

International Search Report issued May 26, 2009 in International (PCT) Application No. PCT/JP2009/055728.

(Continued)

Primary Examiner — Gregory J Toatley
Assistant Examiner — Shawn Decenzo
(74) Attorney, Agent, or Firm — Wenderoth, Lind & Ponack, L.L.P.

(57) ABSTRACT

A method of detecting an amount of an axis displacement in a power transmission device includes, for each of the rotary shafts of the first and second drive sources, measuring an amount of an axis position variation by using non-contact sensors respectively provided to face the rotary shafts, and detecting an amount of a relative axis displacement of the rotary shaft of the second drive source relative to the rotary shaft of the first drive source on the basis of the amount of the axis position variation between before and after engagement.

20 Claims, 3 Drawing Sheets

U.S. PATENT DOCUMENTS

| | | | |
|---|---|---|---|
| 7,175,342 B2* | 2/2007 | Tanaka et al. | 374/55 |
| 2004/0011040 A1 | 1/2004 | Tanaka et al. | |
| 2005/0074049 A1 | 4/2005 | Tanaka et al. | |

FOREIGN PATENT DOCUMENTS

| | | |
|---|---|---|
| JP | 8-149765 | 6/1996 |
| JP | 2003-13709 | 1/2003 |
| JP | 2005-106738 | 4/2005 |

OTHER PUBLICATIONS

"One year on: Enfield is the Definitive GT26B", International Turbomachinery, Nov./Dec. 2001, pp. 1-6.

"Siemens on Fast Track to Commission Santa Rita", International Turbomachinery, Mar./Apr. 2000, pp. 1-4.

Wolfgang Menapace et al., "Extending the Range of Single-Shaft Combined Cycle Power Plants", Siemens AG, Power Generation, Germany, pp. 1-12.

"SSS Clutch: Key to Combined Cycle Flexibility", Compiled for SSS Gears Ltd, International Turbomachinery, pp. 1-4.

Matthias Humer et al., "Vibration Controlled Determination of the Clutch Angle for Single-Shaftcouplings", ISCORMA-4, Calgary, Alberta, Canada, Aug. 27-30, 2007, pp. 1-8.

Bernd Lüneburg et al., "Evaluation of Impact Loads of Clutch Engaging within Single Shaft Applications for Power Generation", ASME Turbo Expo 2008, Jun. 9-13, 2008, Berlin, Germany, pp. 1-10.

Supplementary European Search Report issued Nov. 2, 2010 in corresponding European Patent Application No. 09728980.5.

International Preliminary Report on Patentability and Written Opinion of the International Searching Authority issued Dec. 23, 2010 in International (PCT) Application No. PCT/JP2009/055728.

Chinese Office Action issued Aug. 18, 2011 in corresponding Chinese Patent Application No. 200980101591.9 w/English translation.

Supplementary European Search Report issued Nov. 2, 2010 in corresponding European Application No. 09728980.5.

"SSS Clutch Operating Principle", SSS Clutch Company, Inc., Publication No. 100, Revision No. 2; Nov. 1, 2001.

* cited by examiner

METHOD OF DETECTING AMOUNT OF AXIS DISPLACEMENT IN POWER TRANSMISSION DEVICE USING AUTOMATIC SELF-ALIGNING ENGAGEMENT CLUTCH

TECHNICAL FIELD

The present invention relates to a method of detecting an amount of an axis displacement in a power transmission device using an automatic self-aligning engagement clutch, and particularly, to a method of detecting an amount of an axis displacement in a power transmission device configured to transmit a driving force to a driven body in such a manner that a rotary shaft of a first drive source engages with a rotary shaft of a second drive source through, for example, an automatic self-aligning engagement clutch called an SSS clutch (Synchro Self Shifting) and having a helical spline engagement structure.

BACKGROUND ART

In recent years, in order to highly efficiently reduce a discharge amount of harmful materials such as NOx and to flexibly handle a variation in power consumption per day, for example, as introduced in Patent Document 1 corresponding to the application of the present applicant, a single shaft combined plant having one directly-connected shaft is used. The single shaft combined plant performs an engagement or disengagement operation of a gas turbine and a steam turbine to a generator in accordance with an occasional demand through an automatic self-aligning engagement clutch (hereinafter, simply referred to as an SSS clutch) using a helical spline engagement structure and called an SSS (Synchro Self Shifting) clutch. An example of such a structure and an operation thereof is introduced in Patent Document 1 (Japanese Patent Application Laid-Open No. 2003-013709).

In this kind of single shaft combined plant, for example, during a start operation, the steam turbine is driven by steam generated by the operation of the gas turbine. For this reason, first, the gas turbine is operated while the steam turbine is in an idle state. When steam is generated, the steam turbine is operated. Accordingly, a driving shaft of the steam turbine may be connected to the generator through the SSS clutch almost at a rated rpm. Alternatively, the steam turbine may be stopped when the power demand is small at nighttime, and may be operated and connected to the generator through the SSS clutch when the power demand is large at daytime.

However, in this kind of single shaft combined plant with such a configuration, a variation occurs in a ground having the plant installed thereon due to a variation in age or an earthquake, and an axis displacement may occur between the shaft of the gas turbine and the shaft of the steam turbine. In addition, as described above, the gas turbine is started first during the start operation, and then the steam turbine is started. However, since the gas turbine is rotated at a rated rpm for a long time, a bearing support base of the SSS clutch on the side of the gas turbine is expanded due to a high drain oil temperature of a bearing. On the contrary, since an expansion rate of a bearing support base of the SSS clutch on the side of the steam turbine is different in accordance with the state of the steam turbine, an axis displacement occurs between the shaft of the gas turbine and the shaft of the steam turbine. In addition, a difference in slope or a difference in uplift occurs between the shaft of the gas turbine and the shaft of the steam turbine.

For this reason, when the generator, the gas turbine, and the steam turbine engage with each other through the SSS clutch, when the amount of the axis displacement between the shaft of the gas turbine and the shaft of the steam turbine becomes a value larger than a predetermined specified value, the engagement operation of the SSS clutch is performed in the state where all the gas turbine, the generator, and the steam turbine are rotated almost at a rated rpm. For this reason, an excessive stress is applied to the SSS clutch. As a result, the clutch may be damaged.

Therefore, it is necessary to periodically measure the amount of the axis displacement, but it is difficult to check the amount of the axis displacement during an operation. Thus, the peripheral parts of the corresponding part are disassembled in the state where the operation is stopped. Then, for example, a rotor of the generator is rotated by a hand, and a measurement operation of the amount of the axis displacement needs to be performed by using a dial gauge or the like. However, in such a measurement operation, since it takes time to disassemble the peripheral parts of the corresponding part and to perform the measurement operation of the amount of the axis displacement, a cost involved therewith is required.

For this reason, for example, in Patent Document 2 (Japanese Patent Application Laid-Open No. 2005-106738), the present applicant has proposed an axis displacement measuring apparatus, an axis displacement measuring method, a single shaft combined plant using the axis displacement measuring apparatus, and a method of starting the single shaft combined plant which measure an amount of an axis displacement upon performing an engagement operation of the SSS clutch during an operation by using various sensors such as a temperature sensor for obtaining an expansion amount using a temperature of each of bearing support bases supporting driving shaft bearings on both sides of the SSS clutch, a gap measuring sensor for calculating a slope of a shaft by measuring a gap between an upper fixed point of the shaft and a lower fixed point thereof, and a gap measuring sensor provided at plural points in the circumferential direction of the bearing so as to obtain an amount of an axis displacement.

However, in the single shaft combined plant disclosed in Patent Document 1, the axis displacement detection operation for detecting whether the normal engagement operation of the SSS clutch is performed is not mentioned. In addition, in the axis displacement measuring method disclosed in Patent Document 2, since plural temperature sensors or gap measuring sensors are required, a cost involved therewith is required. Also, since the measurement operation is indirectly performed by calculating the amount of the axis displacement on the basis of the measurement result of the sensors, a calculation error may occur due to a data conversion.

For this reason, an object of the invention is to provide a method of detecting an amount of an axis displacement in a power transmission device using an automatic self-aligning engagement clutch, the method being capable of directly and accurately detecting the amount of the axis displacement in the automatic self-aligning engagement clutch during an operation with a simple configuration.

DISCLOSURE OF THE INVENTION

In order to achieve the above-described object, according to the invention, there is provided a method of detecting an amount of an axis displacement in a power transmission device using an automatic self-aligning engagement clutch, the method being used to detect an amount of an axis displacement of a rotary shaft of a second drive source relative to a rotary shaft of a first drive source in the power transmission device configured to transmit a driving force to a driven body by allowing the rotary shaft of the first drive source to engage with the rotary shaft of the second drive source through the automatic self-aligning engagement clutch, the method including: measuring an amount of an axis position variation of each of the rotary shaft of the first drive source and the rotary shaft of the second drive source by using non-contact sensors respectively provided to face the rotary shafts; and detecting an amount of a relative axis displacement of the rotary shaft of the second drive source relative to the rotary shaft of the first drive source on the basis of the measurement result of the amount of the axis position variation of each rotary shaft when the rotary shaft of the first drive source engages with the rotary shaft of the second drive source through the automatic self-aligning engagement clutch.

Likewise, the non-contact sensors are respectively provided in the rotary shaft of the first drive source and the rotary shaft of the second drive source, and the amount of the relative axis displacement of the rotary shaft of the second drive source relative to the rotary shaft of the first drive source is detected on the basis of the measurement result of the amount of the axis position variation using both the non-contact sensors during the engagement operation through the automatic self-aligning engagement clutch. At this time, even when there is a slight axis displacement between the rotary shaft of the first drive source and the rotary shaft of the second drive source, the automatic self-aligning engagement clutch performs the engagement operation therebetween so that both axes thereof are substantially aligned to each other. For this reason, since it is possible to accurately detect the amount of the axis displacement by monitoring the movement amount of the rotary shaft of the first drive source and the rotary shaft of the second drive source upon performing the engagement operation thereof, it is possible to provide the method of detecting the amount of the axis displacement in the power transmission device using the automatic self-aligning engagement clutch which can be directly performed during an operation with a simple configuration.

In addition, the measurement of the amount of the axis position variation of each of the rotary shaft of the first drive source and the rotary shaft of the second drive source by using the non-contact sensors is performed by using an integral value of the measurement result of the amount of the axis position variation using the non-contact sensors. Accordingly, for example, even in the case where unevenness is formed on a surface of a connection portion formed by casting and performing a connection operation between the rotary shaft of the first drive source and the rotary shaft of the second drive source in the automatic self-aligning engagement clutch, and the amount of the axis displacement cannot be accurately measured, it is possible to accurately obtain the amount of the axis position variation in such a manner that the measurement result is integrated and an average value thereof is obtained.

When the amount of the relative axis displacement of the rotary shaft of the second drive source relative to the rotary shaft of the first drive source exceeds a predetermined amount of an axis displacement, an alarm for prompting an axis position adjustment is generated to the outside. Accordingly, it is possible to correct the amount of the axis displacement as an appropriate value before the clutch is damaged by an excessive stress applied to the clutch due to the axis displacement.

Further, the driven body is a generator, and an engagement operation between the rotary shaft of the first drive source and the rotary shaft of the second drive source through the automatic self-aligning engagement clutch is detected on the basis of a variation in output of the generator. Accordingly, for example, in the case where the generator is driven by a steam turbine and a gas turbine, and a driving force of the steam turbine is used or stopped in accordance with the power demand as described above, the output of the generator increases if the driving force of the steam turbine is used when the power demand increases. Accordingly, since the engagement operation between the rotary shaft of the first drive source and the rotary shaft of the second drive source in accordance with the increase is detected, it is possible to accurately detect the engagement operation without using particular engagement detecting means. In addition, since the self-aligning operation of the clutch is performed by a force of a transmission torque, it is possible to accurately detect the establishment of the engagement operation and the self-aligning operation on the basis of an increase in torque, that is, an increase in output of the generator.

Furthermore, each of the non-contact sensors is configured as an eddy current type gap sensor which detects the amount of the axis displacement on the basis of a variation in eddy current flowing in surfaces of the rotary shaft of the first drive source and the rotary shaft of the second drive source in such a manner that the non-contact sensors are installed at fixed points different from those of casings of the first drive source and the second drive source so as to be distant by a predetermined distance from the rotary shaft of the first drive source and the rotary shaft of the second drive source, and a high-frequency current flows to a sensor head constituting the non-contact sensor. Accordingly, in the eddy current type gap sensor, a measurement object needs to be metal, and the measurement distance needs to be short. However, the eddy current type gap sensor has a high resolution, a high precision, and an excellent environment resistance to dust, water, and oil. For this reason, the eddy current type gap sensor is best suitable to measure the amount of the axis displacement of the rotary shaft of the generator.

In the same manner, each of the non-contact sensors is configured as a CCD laser displacement sensor which detects the amount of the axis displacement through a triangular distance measurement in such a manner that the non-contact sensors are installed at fixed points different from those of casings of the first drive source and the second drive source so as to be distant by a predetermined distance from the rotary shaft of the first drive source and the rotary shaft of the second drive source, the rotary shaft of the first drive source and the rotary shaft of the second drive source are irradiated with a laser beam, and then a reflected beam is received by a light receiving element using a CCD (Charge Coupled Device). In the CCD laser displacement sensor, a measuring surface is small, but the axis displacement can be measured with high precision even at a distant position. For this reason, the CCD laser displacement sensor is best suitable to measure the amount of the axis displacement of the rotary shaft of the generator.

Likewise, according to the invention, since it is possible to measure the amount of the relative axis displacement of the rotary shaft of the first drive source and the rotary shaft of the second drive source in the automatic self-aligning engagement clutch on the basis of the movement amount of each of the rotary shafts during the engagement operation in the automatic self-aligning engagement clutch, even when there is a certain amount of an axis displacement, the self-aligning operation is performed between both shafts during the engagement operation. The movement amount corresponds to the amount of the axis displacement. Accordingly, it is possible to directly and accurately measure the amount of the axis displacement during an operation with a simple configuration. Therefore, it is possible to provide the method of detecting the amount of the axis displacement in the power transmission device using the automatic self-aligning engagement clutch which is excellent in cost and precision compared with the method of the known apparatus which calculates the amount of the axis displacement by using plural sensors, where the known method is expensive and has an error caused by an indirect measurement operation.

BRIEF DESCRIPTION OF THE DRAWINGS

FIG. 2(A) shows a case immediately after an adjustment, FIG. 2(B) shows a case after several years, and FIG. 2(C) shows a case after five years or more.

BEST MODE FOR CARRYING OUT THE INVENTION

Hereinafter, an exemplary embodiment of the invention will be described in detail with reference to the accompanying drawings. However, the dimensions, materials, shapes, and relative arrangement of the constituents described in this embodiment are not used to limit the scope of the invention unless a particular description is made, and are merely examples of the invention.

First Embodiment

Figure 1:
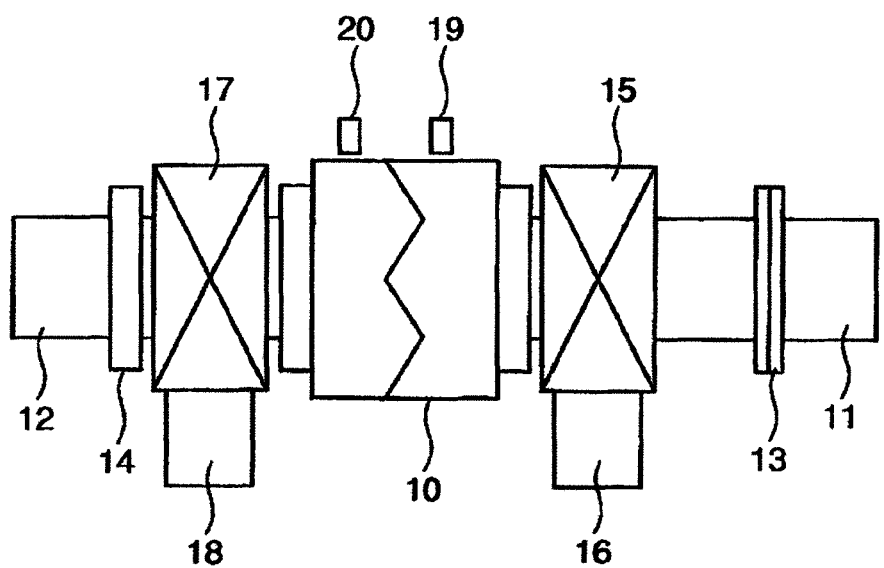
FIG. 1 is a block diagram showing a schematic example of a power transmission device and an arrangement state of proximity sensors for detecting an amount of an axis displacement, which are used to realize a method of detecting an amount of an axis displacement in a power transmission device using an automatic self-aligning engagement clutch according to the invention.

FIG. 1 is a block diagram showing a schematic example of a power transmission device and an arrangement state of proximity sensors for detecting an amount of an axis displacement, which are used to realize a method of detecting an amount of an axis displacement in a power transmission device using an automatic self-aligning engagement clutch according to the invention. FIG. 2(A) to 2(c) are graphs showing an example of an amount of an axis displacement due to a variation in age, where FIG. 2(A) shows a case immediately after an adjustment of an amount of an axis displacement, FIG. 2(B) shows a case after several years, and FIG. 2(C) shows a case after five years or more. FIG. 3 is a block diagram showing a configuration of an electric power facility as a single shaft combined plant which realizes a method of detecting an amount of an axis displacement in a power transmission device using an automatic self-aligning engagement clutch according to the invention.

First, the block diagram showing the configuration of the single shaft combined plant for realizing the method of detecting the amount of the axis displacement in the power transmission device using the automatic self-aligning engagement clutch according to the invention will be described with reference to FIG. 3. In the drawing, the reference numeral 10 denotes an automatic self-aligning engagement clutch (hereinafter, simply referred to as an SSS clutch) using a helical spline engagement structure and called an SSS (Synchro Self Shifting) clutch, where an example of a structure and an operation thereof is introduced in Patent Document 1, and the SSS clutch is used to perform, for example, an engagement or disengagement operation between a shaft 11 of a gas turbine GT 33 as a first drive source and a shaft 12 of a steam turbine ST 35 as a second drive source. The reference numeral 31 denotes a compressor which compresses external air. The reference numeral 31a denotes an inlet guide vane (IGV) which is a first stage stator vane of the compressor 31 and controls a flow rate of air supplied to the compressor 31. The reference numeral 32 denotes a combustor which burns fuel by using the compressed air supplied from the compressor 31 so as to supply combustion gas. The reference numeral 32b denotes a fuel control valve which controls a flow rate of fuel supplied to the combustor 32. The reference numeral 33 denotes a gas turbine GT which is rotated by combustion gas supplied from the combustor 32. The reference numeral 34 denotes an exhaust gas boiler (HRSG) which generates steam by using exhaust gas generated from the gas turbine GT33. The reference numeral 35 denotes a steam turbine which is rotated by steam supplied from the exhaust gas boiler HRSG 34. The reference numeral 35b denotes a steam control valve which controls an amount of steam generated from the exhaust gas boiler HRSG 34 and supplied to the steam turbine ST 35. The reference numeral 36 denotes a generator as a driven source which is rotated by the gas turbine GT33 and the steam turbine ST 35 so as to generate electricity. The reference numeral 37 denotes a condenser which collects steam discharged from the steam turbine ST 35 and supplies the collected steam to the exhaust gas boiler HRSG 34. The reference numeral 38 denotes a chimney which discharges exhaust gas generated from the gas turbine GT 33 and discharged from the exhaust gas boiler HRSG 34. The reference numeral 39 denotes a controller which controls the operations of the respective blocks.

In an electric power facility as the single shaft combined plant, external air is compressed by the inlet guide vane (IGV) 31a, corresponding to the first stage stator vane of the compressor 31 and controlling the flow rate of the air supplied to the compressor 31, while controlling a flow rate thereof. The gas turbine GT 33 is rotated by combustion gas supplied from the combustor 32 burning fuel by using the compressed air, and the steam turbine ST 35 is rotated by steam supplied from the exhaust gas boiler (HRSG) 34 generating steam by using exhaust gas supplied from the gas turbine GT 33. Then, the rotation of the gas turbine GT 33 and the steam turbine ST 35 is transmitted to the generator 36 through the SSS clutch 10, performing the engagement or disengagement operation between the shafts 11 and 12, so as to generate electricity. In addition, the steam discharged from the steam turbine ST 35 is collected by the condenser 37, and is supplied to the exhaust gas boiler (HRSG) 34. The exhaust gas generated from the gas turbine 3 and discharged from the exhaust gas boiler (HRSG) 34 is discharged from the chimney 38.

In addition, among them, the flow rate of the fuel supplied to the combustor 32 is controlled by the fuel control valve 32b operated by a control signal transmitted from the controller 39. In addition, the amount of the steam generated from the exhaust gas boiler (HRSG) 34 to be supplied to the steam turbine ST 35 is controlled by the steam control valve 35b operated by the control signal transmitted from the controller 39. The opening degree of the inlet guide vane (IGV) 31 a corresponding to the first stage stator vane of the compressor 31 and controlling the flow rate of the air supplied to the compressor 31 is controlled by the control signal transmitted from the controller 39, thereby controlling the flow rate of the air supplied to the compressor 31 and controlling the rotation speeds of the gas turbine GT 33 and the steam turbine ST 35.

In addition, in the case of the single shaft combined plant shown in FIG. 3, an example is shown in which the shaft 11 of the gas turbine GT 33 is commonly used as the shafts of the compressor 31 and the generator 36.

In the single shaft combined plant with such a configuration, the steam turbine ST 35 is in a disengagement state until the shafts 11 and 12 engage with each other through the SSS clutch 10, and the shaft 12 of the steam turbine 35 is rotated independently from the compressor 31 and the generator 36 rotated by the shaft 11 of the gas turbine GT 33. In addition, when the rotation speeds of the gas turbine GT 33 and the steam turbine ST 35 are substantially equal to each other, the engagement operation of the SSS clutch 10 is automatically performed. Likewise, when the shafts 11 and 12 engage with each other through the SSS clutch 10, the compressor 31, the gas turbine GT 33, the steam turbine ST 35, and the generator 36 are coaxially rotated since the shafts 11 and 12 act as one shaft. When fuel is burned using air compressed by the compressor 31 and supplied to the combustor 32 in this operation state, the gas turbine GT 33 is rotated by combustion gas supplied from the combustor 32, and steam generated from the exhaust gas boiler HRSG 34 using exhaust gas supplied from the gas turbine GT 33 is supplied to the steam turbine ST 35, so that the steam turbine ST 35 is rotated.

In addition, in the following description, the invention is described by exemplifying the case of the single shaft combined electric power plant shown in FIG. 3. However, it is apparent that the invention is applicable to any plant or any power transmission device as well as the single shaft combined electric power plant shown in FIG. 3 if the power transmission device has a configuration in which a rotary shaft of a first drive source engages with a rotary shaft of a second drive source so as to transmit a driving force to a driven body.

FIG. 1 is a block diagram showing a schematic example of a power transmission device and an arrangement state of proximity sensors 19 and 20 for detecting an amount of an axis displacement, which are used to realize a method of detecting an amount of an axis displacement in a power transmission device using the SSS clutch 10 according to the invention. In the drawing, the reference numeral 10 denotes the SSS clutch, where an example of a structure and an operation thereof is introduced in Patent Document 1. The reference numerals 11 and 12 denote, for example, the shafts of the gas turbine GT 33 as the first drive source and the steam turbine ST 35 as the second drive source. The shafts 11 and 12 are connected to, for example, the generator 36 as a driven body through the SSS clutch 10.

The reference numerals 13 and 14 denote, for example, flanges which connect the shafts of the gas turbine GT 33 as the first drive source and the steam turbine ST 35 as the second drive source to the SSS clutch 10. The reference numerals 15 and 17 denote bearings of the shafts. The reference numerals 16 and 18 denote support bases of the bearings 15 and 17. The reference numerals 19 and 20 denote the proximity sensors as non-contact sensors which detect the axis displacement of the shaft of the SSS clutch 10. The proximity sensors 19 and 20 are installed at, for example, fixed points different from those of casings of the gas turbine GT 33 as the first drive source and the steam turbine ST 35 as the second drive source so as to be distant by a predetermined distance from the shaft of the SSS clutch 10. In addition, the shafts 11 and 12 of the gas turbine GT 33 as the first drive source and the steam turbine ST 35 as the second drive source are connected to the shaft of the SSS clutch 10 through the flanges 13 and 14. The shafts 11 and 12 are different from the shaft of the SSS clutch 10, but perform the same operation as that of the shaft of the SSS clutch 10 while being connected thereto through the flanges 13 and 14. For this reason, in the following description, it is assumed that the expression of the shaft 11 of the gas turbine GT 33 and the shaft 12 of the steam turbine ST 35 includes the shaft of the SSS clutch 10 connected thereto through the flanges 13 and 14.

For example, an example of the above-described proximity sensor includes an eddy current type gap sensor which detects the amount of the axis displacement on the basis of a variation in eddy current flowing in the surfaces of the rotary shafts of the first drive source and the second drive source after allowing a high-frequency current to flow to a sensor head constituting a sensor, and a CCD laser displacement sensor which detects the amount of the axis displacement through a triangular distance measurement in such a manner that the sensor is installed at a position distant by a predetermined distance from the rotary shaft of the first drive source and the rotary shaft of the second drive source, the rotary shaft of the first drive source and the rotary shaft of the second drive source are irradiated with a laser beam, and then a reflected beam is received by a light receiving element using a CCD (Charge Coupled Device). In the eddy current type gap sensor, a measurement object needs to be metal, and the measurement distance needs to be short. However, the eddy current type gap sensor has a high resolution, a high precision, and an excellent environment resistance to dust, water, and oil. In addition, in the CCD laser displacement sensor, a measuring surface is small, but the axis displacement can be measured with high precision even at a distant position. For this reason, the CCD laser displacement sensor is best suitable to measure the amount of the axis displacement of the rotary shaft of the generator.

In the method of detecting the amount of the axis displacement in the power transmission device using the SSS clutch 10 with such a configuration according to the invention, the amount of the axis position variation of the rotary shaft 11 of the gas turbine GT 33 as the first drive source and the amount of the axis position variation of the rotary shaft 12 of the steam turbine ST 35 as the second drive source are measured by the proximity sensors 19 and 20 as non-contact sensors provided to face the rotary shafts 11 and 12 thereof. Then, on the basis of the measurement result of the amount of the axis position variation of each of the rotary shafts upon performing an engagement operation (joining operation) between the rotary shaft 11 and the rotary shaft 12 through the SSS clutch 10, the amount of the relative axis displacement of the rotary shaft 12 of the steam turbine ST 35 as the second drive source relative to the rotary shaft 11 of the gas turbine GT 33 as the first drive source is detected.

That is, in the SSS clutch 10, when the amount of the axis displacement between the shafts 11 and 12 engaging with each other becomes a value larger than a predetermined specified value, the engagement operation of the SSS clutch 10 is performed in the state where all the gas turbine GT 33, the generator 36, and the steam turbine ST 35 are rotated almost at a rated rpm. For this reason, an excessive stress is applied to the SSS clutch 10. As a result, the clutch may be damaged. However, it is thought that the amount of the axis displacement between the shafts 11 and 12 almost does not exist in the normal engagement state.

For this reason, even when there is the axis displacement between the shafts 11 and 12 before the engagement operation, the amount of the axis displacement between the shafts 11 and 12 almost does not exist at the moment of the engagement operation. For this reason, the movement amount of the shafts 11 and 12 before and after the engagement operation is obtained, and the movement amount is added, thereby obtaining the amount of the relative axis displacement of the rotary shaft 12 of the steam turbine ST 35 as the second drive source relative to the rotary shaft 11 of the gas turbine GT 33 as the first drive source.

Figure 2:
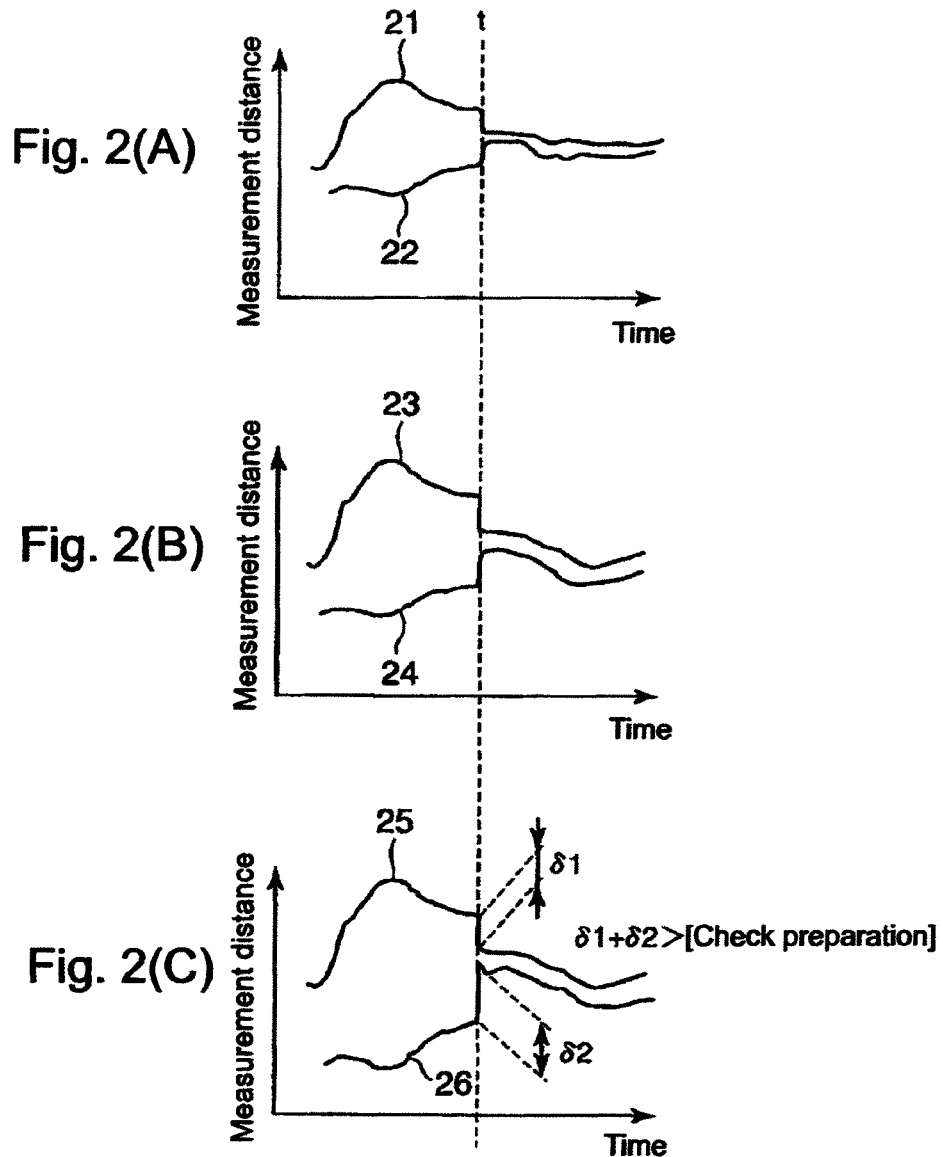
FIG. 2(A) to 2(C) are graphs showing an example of an amount of an axis displacement due to a variation in age, where
Figure 3:
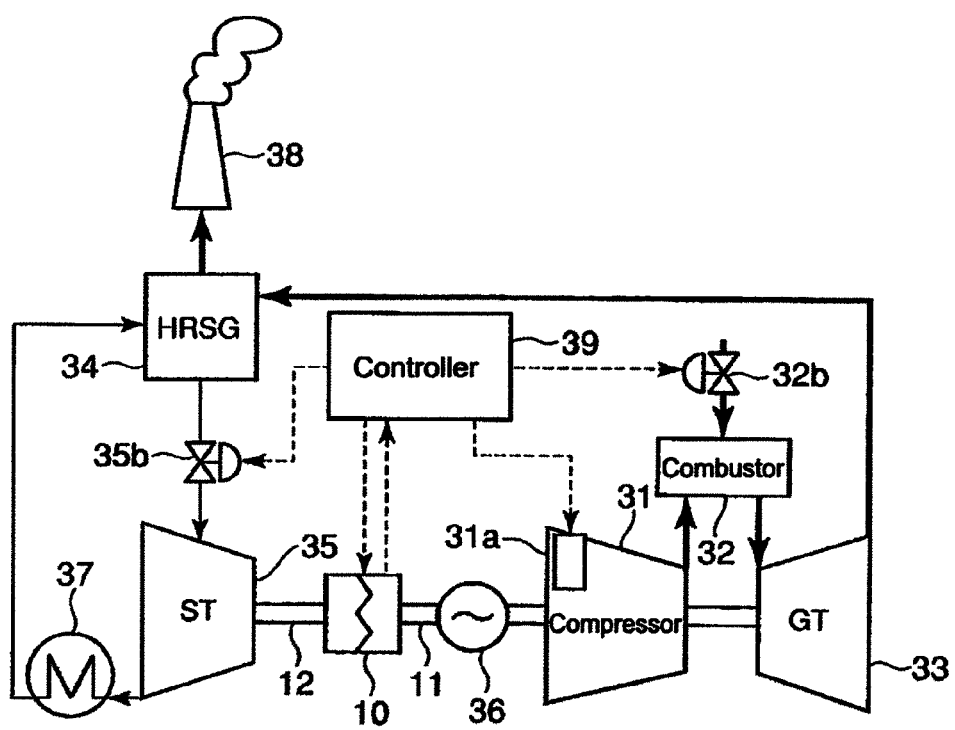
FIG. 3 is a block diagram showing a configuration of a single shaft combined plant.

FIGS. 2(*a*) to 2(C) show an example of the amount of the axis displacement due to a variation in age of the rotary shaft 12 of the steam turbine ST 35 as the second drive source and the rotary shaft 11 of the gas turbine GT 33 as the first drive source, where FIG. 2(A) shows a state immediately after the adjustment of the amount of the axis displacement, FIG. 2(B) shows an example of a state after several years, and FIG. 2(C) shows a state after five years or more in simulation. In the respective graphs, the vertical axis indicates the measurement distance, the horizontal axis indicates the time before and after the engagement operation of the SSS clutch 10, and the engagement operation is performed at the time t. Each of the reference numerals 21 to 26 indicates the amount of the axis displacement of the rotary shaft 12 of the steam turbine ST 35 as the second driver source and the rotary shaft 11 of the gas turbine GT 33 as the first drive source, that is, the amount of the axis displacement of the respective shafts measured by the proximity sensors denoted by the reference numerals 19 and 20 in FIG. 1.

As understood from the graphs, the rotary shaft 11 of the gas turbine GT 33 as the first drive source and the rotary shaft 12 of the steam turbine ST 35 as the second drive source have a deviation indicated by the reference numerals 21 and 22 due to the axis displacement slightly existing even immediately after the adjustment of the amount of the axis displacement shown in FIG. 2(A). However, when the engagement operation is performed at the time t, the amount of the axis displacement of the rotary shaft 12 relative to the rotary shaft 11 is adjusted, and hence as described above, the amount of the axis displacement almost does not exist at the time when the engagement operation is performed at the time t.

In addition, in the state after several years shown in FIG. 2(B), the amount of the axis displacement becomes large as indicated by the reference numerals 23 and 24 due to a variation in age, but when the amount of the axis displacement of the rotary shaft 12 relative to the rotary shaft 11 is not more than a predetermined value, the engagement operation is normally performed. However, as shown in FIG. 2(C), for example, in the state after five years or more, the amount of the axis displacement becomes larger due to a variation in age. For this reason, in the state shown in FIG. 2(C), it is necessary to adjust the amount of the axis displacement, but the amount of the axis displacement shown in the graphs in FIGS. 2(A), 2(B), and 2(C) is detected by the above-described method as below.

For example, as shown in FIG. 2(C), assuming that the measurement amount of the rotary shaft 11 is indicated by the reference numeral 25, the measurement amount of the rotary shaft 12 is indicated by the reference numeral 26, the movement amount of the measurement amount indicated by the reference numeral 25 upon performing the engagement operation is indicated by $\delta 1$, and the movement amount of the measurement amount indicated by the reference numeral 26 upon performing the engagement operation is indicated by $\delta 2$, when the engagement operation is performed at the time t, as described above, the amount of the axis displacement almost does not exist due to the engagement operation. The small amount of the axis displacement, that is, the movement amount ($\delta 1+\delta 2$) of the axis of the position of the axis immediately before the engagement operation at the time t and the position of the axis with a small amount of displacement upon performing the engagement operation is the amount of the axis displacement of the rotary shaft 11 of the gas turbine GT 33 as the first drive source relative to the rotary shaft 12 of the steam turbine ST 35 as the second drive source.

For this reason, when the movement amount ($\delta 1+\delta 2$) of the axis is larger than a predetermined check reference value (preset value), for example, R, the controller 39 shown in FIG. 3 detects such a state, and informs the outside of the self-aligning request by using, for example, a display device (not shown) connected to the controller 39, a warning operation using a synthetic sound, or particular warning sound generating means. Accordingly, as described above, the engagement operation of the SSS clutch 10 is performed in the state where all the gas turbine GT 33, the generator 36, and the steam turbine ST 35 are rotated almost at a rated speed. As a result, it is possible to previously prevent a problem such as that an excessive stress is applied to the SSS clutch 10 and hence the SSS clutch 10 is damaged.

In addition, as described above, the measurement of the amount of the axis position variation of the rotary shaft 11 of the gas turbine GT 33 as the first drive source and the rotary shaft 12 of the steam turbine ST 35 as the second drive source is performed by the proximity sensors 19 and 20 such as the eddy current type gap sensor and the CCD laser displacement sensor. However, in the case where the rotary shaft is formed by casting, the surface thereof has unevenness, and hence the accurate measurement of the amount of the axis displacement is difficult. For this reason, for example, when the measurement result obtained by the proximity sensors 19 and 20 is integrated for every rotation angle, and an average value thereof is used, it is possible to obtain the accurate amount of the axis position variation even in this case. Accordingly, it is desirable that such a circuit is attached to the controller 39.

Further, in the detection of the time point of the engagement operation using the SSS clutch 10, it may be determined that the engagement operation is performed when the measurement result of the amount of the axis position variation using the proximity sensors 19 and 20 is not less than a predetermined value. However, since the self-aligning operation of the clutch is performed by a force of a transmission torque, in the case where the generator 36 is used as the driven source as shown in FIG. 3 and in the case where the steam turbine ST 35 is added or stopped while the generator 36 is driven only by the gas turbine GT 33 during a start operation, the output of the generator 36 increases or decreases. For this reason, when the engagement or disengagement operation between the rotary shaft 11 of the first drive source and the rotary shaft 12 of the second drive source is performed by an increase or decrease in output, it is possible to accurately detect the engagement operation and the completion of the self-aligning operation without using particular engagement detecting means.

As mentioned above in various ways, according to the invention, the non-contact sensors 19 and 20 are respectively provided in the rotary shaft 11 of the first drive source and the rotary shaft 12 of the second drive source, and the amount of the relative axis displacement of the rotary shaft 12 of the second drive source relative to the rotary shaft 11 of the first drive source is detected on the basis of the measurement result of the amount of the axis position variation using both the non-contact sensors 19 and 20 during the engagement operation through the SSS clutch 10. At this time, even when there is a slight axis displacement between the rotary shaft 11 of the first drive source and the rotary shaft 12 of the second drive source, the SSS clutch 10 performs the engagement operation therebetween so that both axes thereof are substantially aligned to each other. For this reason, since it is possible to accurately detect the amount of the axis displacement by monitoring the movement amount of the rotary shaft 11 of the first drive source and the rotary shaft 12 of the second drive source at the time point of the engagement operation, it is possible to provide the method of detecting the amount of the axis displacement in the power transmission device using the automatic self-aligning engagement clutch which can be directly performed during an operation with a simple configuration.

INDUSTRIAL APPLICABILITY

According to the invention, since it is possible to measure the amount of the axis displacement of the power transmission device using the SSS clutch in an operation mode with a simple configuration, it is possible to provide the power transmission device capable of previously preventing a damage of the SSS clutch caused by the axis displacement of the power transmission device using the SSS clutch.

The invention claimed is:

1. A method of detecting an amount of an axis displacement in a power transmission device, the power transmission device including a rotary shaft of a first drive source, a rotary shaft of a second drive source, and an automatic self-aligning engagement clutch which corrects misaligned positions of the rotary shaft of the first drive source and the rotary shaft of the second drive source to be concentric with each other when the rotary shafts are engaged, wherein the power transmission device is configured to transmit a driving force to a driven body by allowing the rotary shaft of the first drive source to engage with the rotary shaft of the second drive source through the automatic self-aligning engagement clutch, the method comprising:
for each of the rotary shafts of the first and second drive sources, measuring an amount of an axis position variation between before and after engagement of the rotary shafts through the self-aligning engagement clutch by using non-contact sensors respectively provided to face the rotary shafts; and
detecting an amount of a relative axis displacement of the rotary shaft of the second drive source relative to the rotary shaft of the first drive source on the basis of the amount of the axis position variation between before and after engagement.

2. The method of claim 1,
wherein the measurement of the amount of the axis position variation of each of the rotary shaft of the first drive source and the rotary shaft of the second drive source by using the non-contact sensors is performed by using an integral value of the measurement result of the amount of the axis position variation using the non-contact sensors.

3. The method of claim 2, further comprising:
generating an alarm when the amount of the relative axis displacement of the rotary shaft of the second drive source relative to the rotary shaft of the first drive source exceeds a predetermined amount of an axis displacement, for prompting an axis position adjustment.

4. The method of claim 3,
wherein the driven body is a generator, and
wherein an engagement operation between the rotary shaft of the first drive source and the rotary shaft of the second drive source through the automatic self-aligning engagement clutch is detected on the basis of a variation in output of the generator.

5. The method of claim 3, wherein each of the non-contact sensors is an eddy current gap sensor which detects the amount of the axis displacement on the basis of a variation in eddy current flowing in surfaces of the rotary shaft of the first drive source and the rotary shaft of the second drive source, and
wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

6. The method of claim 3, wherein each of the non-contact sensors is a CCD laser displacement sensor which detects the amount of the axis displacement through a triangular distance measurement,
wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
wherein the rotary shaft of the first drive source and the rotary shaft of the second drive source are irradiated with a laser beam, and then a reflected beam is received by a light receiving element using a Charge Coupled Device.

7. The method of claim 2,
wherein the driven body is a generator, and
wherein an engagement operation between the rotary shaft of the first drive source and the rotary shaft of the second drive source through the automatic self-aligning engagement clutch is detected on the basis of a variation in output of the generator.

8. The method of claim 7, wherein each of the non-contact sensors is an eddy current gap sensor which detects the amount of the axis displacement on the basis of a variation in eddy current flowing in surfaces of the rotary shaft of the first drive source and the rotary shaft of the second drive source, and
wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

9. The method of claim 7, wherein each of the non-contact sensors is a CCD laser displacement sensor which detects the amount of the axis displacement through a triangular distance measurement,
wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
wherein the rotary shaft of the first drive source and the rotary shaft of the second drive source are irradiated with a laser beam, and then a reflected beam is received by a light receiving element using a Charge Coupled Device.

10. The method of claim 2, wherein each of the non-contact sensors is an eddy current gap sensor which detects the amount of the axis displacement on the basis of a variation in eddy current flowing in surfaces of the rotary shaft of the first drive source and the rotary shaft of the second drive source, and wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

11. The method of claim 2, wherein each of the non-contact sensors is a CCD laser displacement sensor which detects the amount of the axis displacement through a triangular distance measurement,
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
   wherein the rotary shaft of the first drive source and the rotary shaft of the second drive source are irradiated with a laser beam, and then a reflected beam is received by a light receiving element using a Charge Coupled Device.

12. The method of claim 1, further comprising:
   generating an alarm when the amount of the relative axis displacement of the rotary shaft of the second drive source relative to the rotary shaft of the first drive source exceeds a predetermined amount of an axis displacement, for prompting an axis position adjustment.

13. The method of claim 12,
   wherein the driven body is a generator, and
   wherein an engagement operation between the rotary shaft of the first drive source and the rotary shaft of the second drive source through the automatic self-aligning engagement clutch is detected on the basis of a variation in output of the generator.

14. The method of claim 12, wherein each of the non-contact sensors is an eddy current gap sensor which detects the amount of the axis displacement on the basis of a variation in eddy current flowing in surfaces of the rotary shaft of the first drive source and the rotary shaft of the second drive source, and
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

15. The method of claim 12, wherein each of the non-contact sensors is a CCD laser displacement sensor which detects the amount of the axis displacement through a triangular distance measurement,
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
   wherein the rotary shaft of the first drive source and the rotary shaft of the second drive source are irradiated with a laser beam, and then a reflected beam is received by a light receiving element using a Charge Coupled Device.

16. The method of claim 1,
   wherein the driven body is a generator, and
   wherein an engagement operation between the rotary shaft of the first drive source and the rotary shaft of the second drive source through the automatic self-aligning engagement clutch is detected on the basis of a variation in output of the generator.

17. The method of claim 16, wherein each of the non-contact sensors is an eddy current gap sensor which detects the amount of the axis displacement on the basis of a variation in eddy current flowing in surfaces of the rotary shaft of the first drive source and the rotary shaft of the second drive source, and
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

18. The method of claim 16, wherein each of the non-contact sensors is a CCD laser displacement sensor which detects the amount of the axis displacement through a triangular distance measurement,
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
   wherein the rotary shaft of the first drive source and the rotary shaft of the second drive source are irradiated with a laser beam, and then a reflected beam is received by a light receiving element using a Charge Coupled Device.

19. The method of claim 1, wherein each of the non-contact sensors is an eddy current gap sensor which detects the amount of the axis displacement on the basis of a variation in eddy current flowing in surfaces of the rotary shaft of the first drive source and the rotary shaft of the second drive source, and
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and a high-frequency current flows to a sensor head of each of the non-contact sensors.

20. The method of claim 1, wherein each of the non-contact sensors is a CCD laser displacement sensor which detects the amount of the axis displacement through a triangular distance measurement,
   wherein the non-contact sensors are installed at fixed points different from those of casings of the first drive source and the second drive source, the non-contact sensors are spaced apart from the rotary shaft of the first drive source and the rotary shaft of the second drive source by a predetermined distance, and
   wherein the rotary shaft of the first drive source and the rotary shaft of the second drive source are irradiated with a laser beam, and then a reflected beam is received by a light receiving element using a Charge Coupled Device.

* * * * *